United States Patent Office 3,660,578
Patented May 2, 1972

3,660,578
MITOMYCIN C
Toju Hata, Tokyo, Hideo Kamada, Obe-shi, Shigetoshi Wakaki, Tokyo, Shiro Kudo, Sakai-shi, Keitaro Tomioka, Yokkaichi-shi, Hirofuto Marumo, Shizuoka-ken, Eturo Kato, Hofu-shi, and Motoaki Shimizu, Yokkaichi-shi, Japan, assignors to Kyowa Hakko Kogyo Co., Ltd., and Kitasato Kenkyusho (Shadan Hojin), both of Tokyo, Japan
Continuation of application Ser. No. 295,031, July 15, 1963, which is a continuation-in-part of application Ser. No. 121,178, June 30, 1961, which in turn is a continuation-in-part of application Ser. No. 726,189, Apr. 3, 1958. This application Aug. 13, 1968, Ser. No. 752,203
Claims priority, application Japan, Apr. 6, 1957, 32/8,456
Int. Cl. A61k 21/00
U.S. Cl. 424—274                    13 Claims

ABSTRACT OF THE DISCLOSURE

A therapeutically active compound designated Mitomycin C having the formula

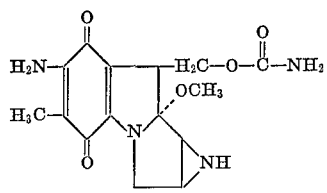

This compound is prepared by culturing *Streptomyces caespitosus* in a liquid nutrient medium.

The present invention relates to the antibiotic Mitomycin C, which is a compound of the formula

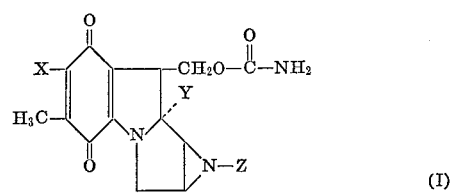

According to the present invention, Mitomycin C is formed during the cultivation, under artificially controlled conditions, of the microorganism, *Streptomyces caespitosus* (NRRL 2564) in a liquid nutrient medium. After separating the resulting mycelium, e.g. by filtration, from the obtained culture broth, Mitomycin C is isolated from the latter, e.g. by active carbon or preferably non-ion exchange resin adsorption, organic solvent extraction or chromatography on alumina.

*Streptomyces caespitosus* also produces Mitomycin A and Mitomycin B. Each of the mitomycins can be defined by the structure of Formula I. Their relationship to each other is set forth in Table I (the designation, X, Y and Z, being those of Formula I.

TABLE I

| Mitomycin: | X | Y | Z |
|---|---|---|---|
| A | —OCH$_3$ | —OCH$_3$ | —H |
| B | —OCH$_3$ | —OH | —CH$_3$ |
| C | —NH$_2$ | —OCH$_3$ | —H |

Further differentiation of the mitomycins is provided by Table II.

TABLE II

| | A | B | C |
|---|---|---|---|
| Melting point | 159° to 161° C. | 182° to 184° C. | Above 360° C. |
| Maximum ultraviolet absorption, mμ. | 215<br>316 to 318<br>530 | 220<br>320<br>550 | 216.<br>360.<br>560. |
| Antibacterial spectrum | More effective against Gram+ than against Gram—. | Generally weaker than C in antibacterial power. Very different from C against Mycobacterium. | Similarly effective against both Gram+ and Gram—. |

CROSS-REFERENCE TO RELATED APPLICATIONS

This application is a continuation of copending application Ser. No. 295,031, filed on July 15, 1963, which in turn is a continuation-in-part of copending application Ser. No. 121,178, filed on June 30, 1961, the latter being a continuation-in-part of application Ser. No. 726,189, filed on Apr. 3, 1958, all the applications now being abandoned.

In the cultivation of *Streptomyces caespitosus* (NRRL 2564), the concentration of Mitomycin C and the relative concentrations of Mitomycin A and Mitomycin B produced are dependent upon the nitrogen source. When *Streptomyces caespitosus* is inoculated to media composed of 2 grams of starch, 3.5 grams of a single nitrogen source set forth in Table III and 100 milliliters (ml.) of water and cultured (shaking-culture at 28° C.) for seven days, the corresponding amounts of Mitomycin C produced are reflected in Table III. When soy-bean meal is the main nitrogen source, a large amount of Mitomycin C is produced with only a slight amount of Mitomycin A and Mitomycin B.

TABLE III

| Nitrogen source: | Mitomycin C concentration (γ/ml.) |
|---|---|
| Soybean meal | 38 |
| Meat extract | <5 |
| Peptone | <5 |
| Dried yeast | 12 |
| Corn steep liquor | <5 |
| Yeast extract | <5 |
| NZ-amine | <5 |
| Gluten meal | <5 |
| Corn flour | 8 |

The data of Table III illustrate a most surprising relationship between the nitrogen source and the amount of Mitomycin C produced, soybean mean (from among the nitrogen sources noted) being essential to significant production. With the increased production of Mitomycin C brought about by the use of soybean meal, the concurrent production of Mitomycin A and Mitomycin B is minimized.

In preparing the culture broth filtrate from which Mitomycin C is isolated, each of the following nutrients may, e.g., be employed in the fermentation medium:

Nitrogen sources:
    Peptone                      Meat extract.
    Corn steep liquor        Soy bean meal.
    Yeast                        Ammonium sulfate.
    Urea                         Ammonium nitrate.
    (but soybean meal is essential)

Carbon sources:
    Glucose                      Starch.
    Glycerol                     Soy bean.
    Oil                           Maltose.
    Dextrine.

Inorganic salts:
    Sodium chloride          Calcium carbonate.
    Potassium chloride      Potassium phosphate.
    Ferrous sulfate           Magnesium sulfate.
    Zinc sulfate.

Each of the enumerated nutrients can be employed in a liquid, e.g. aqueous, medium of pH about 7 in any combination of nitrogen source, carbon source and inorganic salt. However, glucose, starch and glycerol are preferred carbon sources; yeast, meat extract, soybean meal, corn steep liquor and ammonium sulfate are preferred nitrogen sources; and sodium chloride and calcium carbonate are preferred inorganic salts. A liquid culture medium thus comprised of nitrogen source, carbon source and inorganic salts is inoculated with a spore suspension of *Streptomyces caespitosus* (NRRL 2564). The inoculated medium is preferably subjected to submerged aerobic culture for massive yields of Mitomycin C. Maximum Mitomycin C formation (with only slight production of Mitomycin A and Mitomycin B) is generally realized by fermenting at 26° to 32° C. for from 2 to 6 days.

After *Streptomyces caespitosus* (NRRL No. 2564) is cultured in a liquid nutrient medium, as above described and as hereinafter more particularly exemplified, the mycelium is separated from the resultant nutrient liquid, the mycelium being quickly filtered off from the latter as soon as it is cooled down to, e.g., about 0° to 5° C. Mitomycin C is then recovered or isolated from the filtrate (culture broth) as hereinafter described.

According to a first alternative, Mitomycin A, B and C may be adsorbed onto active carbon from the culture broth at pH 6 to 9. Adsorption may take place at a somewhat higher or lower pH value, but as the pH value deviates from the above-specified range, decomposition of Mitomycin C may be encountered. Consequently, the active carbon adsorption should be carried out within the pH range from 6 to 9. Thus, for example, if Mitomycin C is adsorbed onto 1% active carbon for 30 minutes at this pH range and the active carbon is filtered out, the filtrate has substantially no antibiotic and antibacterial activity.

In order to elute Mitomycin C from the active carbon onto which the former is adsorbed, a suitable solvent, such as acetone, cyclohexanone, methyl isobutyl ketone, butanol, chloroform, or a mixture of two or more of these is employed. Acetone is the most suitable and therefore the preferred solvent to be employed according to the invention.

When acetone is used for the elution, water contained in the cake of the active carbon enters into the eluate so that the latter contains a considerable amount of water. Such water content can be avoided by washing the active carbon with pure methanol before the elution. The amount of Mitomycin C that is eluted to loss by methanol out of the active carbon is only about 5%. After the washing with methanol, the active carbon is then eluted with acetone, and when the extract is concentrated under reduced pressure, a concentrated antibiotic-containing complex mixture is obtained.

Non ion exchange resins may be employed in place of active carbon as adsorbents of Mitomycin C. The term of "non ion exchange resins" as used herein means resinous adsorbents without ion exchangeability; they have phenolic OH as well as anilic $NH_2$ in their molecules and exhibit nearly neutral reaction as a whole. Duolite S-30 (a product of Chemical Process Company, U.S.A.), Permutit DR (a product of Permutit Company, U.S.A.) and Illco CA (a product of Illinois Water Treatment Company) are examples of the resins in this group.

To use these resins for extracting Mitomycin C, a culture filtrate containing Mitomycin C is passed through the column of an activated non ion exchange resin at a space velocity of 10 for causing adsorption of Mitomycin C onto the resin. After washing with water, the column is eluted with acetone, an eluent of Mitomycin C, to yield Mitomycin C rich fractions. Although methanol, ethanol, butanol, methyl isobutyl ketone, methyl ethyl ketone and mesityl oxide may be used alone or in combination for eluting Mitomycin C, acetone is found most suitable for this purpose. These Mitomycin C rich fractions are combined and evaporated in vacuo to give an aqueous residue containing Mitomycins.

Mitomycin C may also be extracted from the culture broth filtrate by water-immiscible organic solvents. Water immiscible solvents useful for this purpose include alcohols, such as butanol, esters, such as butyl acetate; ketones, such as methyl isobutyl ketone and cyclohexanone; chloroform and the like. The rate of extraction is favorable and substantially invariable if the pH value is kept within a range from 6 to 9, which pH range is therefore preferable according to the invention. The extraction rate may be increased by simultaneous utilization of salting out agents, such as common salt (NaCl), ammonium sulfate or the like, in the aqueous layer. With addition of various amounts (by weight) of common salt, chloroform extraction at pH 7.0 takes place at the following extraction rates:

| Salt concentration in aqueous layer: | Partition coefficient (chloroform layer/ aqueous layer) |
|---|---|
| 0% NaCl | 0.12/1 |
| 15% NaCl | 0.25/1 |
| 30% NaCl | 0.22/1 |

The extract is concentrated under reduced pressure, and a concentrated antibiotic-containing complex mixture is obtained.

In order to isolate Mitomycin C selectively from the aforesaid complex mixture containing the same, the mixture is subjected, e.g., to chromatography on an alumina column, or a counter-current distribution process may be employed.

The concentrate of the complex mixture obtained by active carbon adsorption or organic solvent extraction, as described hereinbefore, is dissolved in chloroform. When chloroform is employed for the extraction, the extract is concentrated, and the resulting concentrate is used. The chloroform solution is then passed through a tower packed with active alumina. The highly adsorbable Mitomycin C is adsorbed in the upper portion of the tower, while the chloroform flows down through Thereupon, chloroform which contains 0.5% to 6% (by volume) of methanol is passed through the tower, whereby Mitomycin C is separated into an uppermost layer of a distinctive purple color. Since the $R_f$ values for Mitomycin A and Mitomycin B are greater than that of C, Mitomycin A and Mitomycin B are separated into the down most layers. Upon continued elution with a developing solvent, followed by elution with chloroform which contains 2 to 2.9% by volume of methanol, undesired material is eluted out. The desired uppermost layer containing the new antibiotic, Mitomycin C, is then eluted out with chloroform which contains 3 to 6% by volume of methanol.

The methanol in the developing solvent can be replaced by ethanol or butanol. Acetone can also be used, although the yield may be somewhat reduced.

The purple colored adsorption layer of Mitomycin C may be cut out together with the alumina on which it is adsorbed, and may be eluted by methanol. Then, the eluate is concentrated under reduced pressure to obtain the desired crystals of Mitomycin C.

Mitomycin C, obtained as above, is dissolved in chloroform, and the chloroform solution is concentrated to substantial dryness. When a small amount of acetone is then added thereto, dark purple crystals are obtained.

In isolating Mitomycin C by counter-current distribution, chloroform can, e.g., be used as the fixed phase, while the moving phase (which contains the culture broth filtrate) may be constituted by an aqueous phosphate buffer of pH 6.0 containing 10% (w./v.) of common salt (NaCl). If the separation is effected in a 30-tube machine, Mitomycin C is collected in the 20th to 25th tubes. The content of these tubes is concentrated, yielding Mitomycin C.

Mitomycin C, obtained by any of these methods, is in the form of needle-shaped crystals which are of deep purple color and which do not melt even at 360° C.

On the accompanying sheet of drawing.

Figure 2:
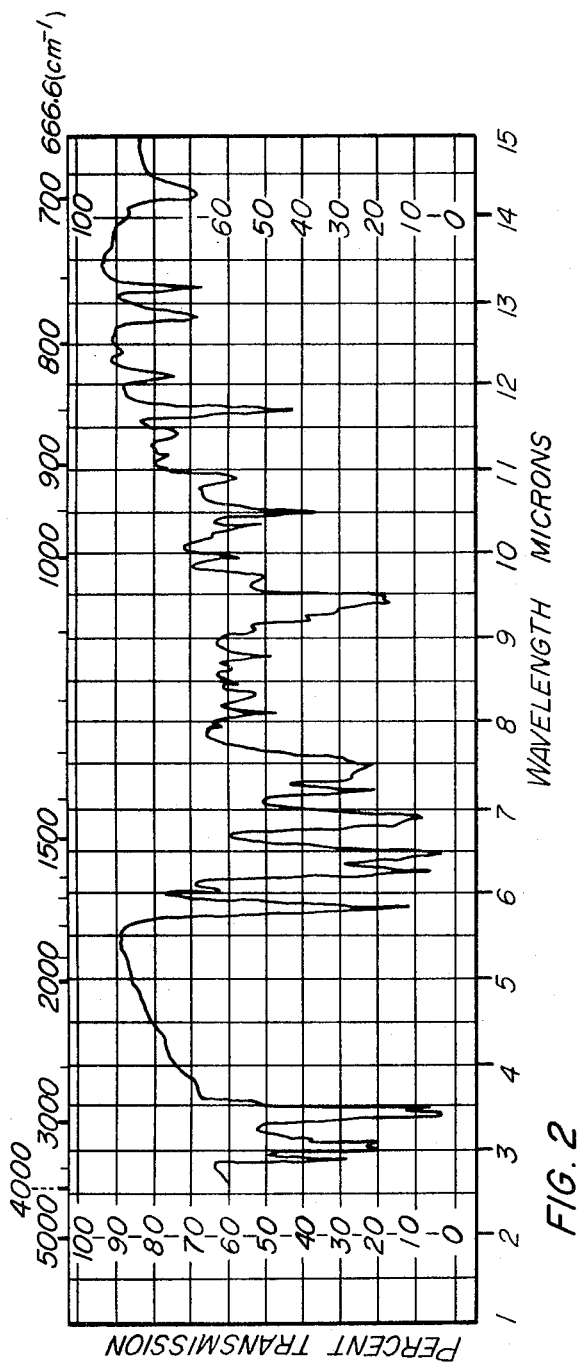
FIG. 2 is an infra-red absorption spectrum of Mitomycin C in Nujol paste.
Figure 1:
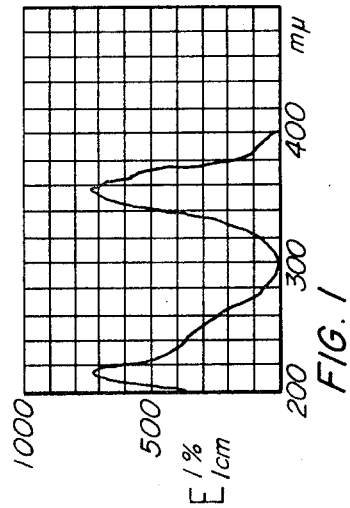
FIG. 1 is a ultra-violet absorption spectrum of Mitomycin C.

As in clear from FIG. 1, peaks are observed on the ultra-violet absorption spectrum at 216 m$\mu$, $E_{1cm.}^{1\%}=742$; at 360 m$\mu$, $E_{1cm.}^{1\%}=742$; and at 560 m$\mu$, $E_{1cm.}^{1\%}=0.06$ As is clear from FIG. 2, infra-red absorption spectrum peaks are observed at the following frequencies (microns):

2.89, 2.99, 3.04, 3.42, 3.50, 5.80, 6.06, 6.24, 6.44, 6.85, 7.23, 7.49, 8.00, 8.12, 8.37, 8.50, 8.67, 8.80, 9.44, 9.73, 10.00, 10.36, 10.50, 10.90, 11.17, 11.41, 11.71, 12.15, 12.41, 12.84, 13.22, 14.28.

Mitomycin C has a low solubility in general, but is relatively easily soluble in water, methanol, ethanol and chloroform; is slightly soluble in carbon tetrachloride, benzene and ethyl ether; and is insoluble in petroleum ether. It gives positive reactions in the following reactions:

Fehling's reaction, Ehrlich's reaction, Liebermann's reaction, Biuret reaction, reaction with hydroxylamino, reaction with ferric chloride, and reaction with nitrous acid.

The following reactions are negative:

Benedict's reaction, Tollens' reaction, Million's reaction, Raymond's reaction, Legal's reaction, reaction with fuchsin sulfite, reaction with ninhydrin, reaction with xanthogen and reaction with potassium cyanide.

The aqueous solution of Mitomycin C is stable at neutral pH, and substantially no lowering of potency is observed even after heating for one hour at 80° C. However, on the acidic side at a pH lower than 6 and also on the basic side at a pH higher than 11, it is destroyed rapidly. Further, it is considerably less stable in an organic solvent solution than in aqueous solution, particularly when irradiated with visible light in an organic solvent, it is quite rapidly destroyed. For example, when its chloroform solution is left standing at ordinary temperatures in daylight inside a room, almost all potency is lost after 6 hours, but in a dark place its potency is not substantially lowered.

The crystals of Mitomycin C are extremely stable at ordinary temperature (20° to 30° C.).

The antimicrobial spectrum of Mitomycin C is as follows:

| Test organisims | Minimum inhibitory concentration [1] |
|---|---|
| Pseudomonas aeruginosa | 3.1 |
| Staphylococcus aureous 209P | 0.1 |
| Staphylococcus albus | 0.1 |
| Staphylococcus citreus | 0.1 |
| Sarcina lutea | 0.1 |
| Diplococcus pneumoniae type 1 | 0.1 |
| Streptococcus hemolyticus | 0.1 |
| Streptococcus lactis | 25.0 |
| Corynebacterium diphtheriae | 0.1 |
| Hemophilus pertussis (original) | 0.4 |
| Hemophilus pertussis (Sakairi) | 0.4 |
| Escherichia coli | 0.2 |
| Klebsiella pneumoniae (ATCC 602) | 0.005 |
| Proteus vulgaris (oX 19) | 0.025 |
| Salmonella typhosa | 0.8 |
| Salmonella paratyphi A | 0.8 |
| Shigella dysenteriae | 0.8 |
| Brucella abortus | 0.1 |
| Brucella megatherium | 0.4 |
| Brucella mycoides | 0.05 |
| Brucella anthracis | 0.1 |
| Mycobacterium ATCC 607 | 0.2 |
| Mycobacterium avium | 0.2 |
| Mycobacterium phlei | 0.2 |
| Nocardia asteroides | 25.0 |
| Saccharomyces cerevisiae | 25.0 |
| Candida albicans | 25.0 |
| Penicillium glaucum | 25.0 |
| Aspergillus niger | 25.0 |

[1] Micrograms per milliliter.

Mitomycin C is useful in vitro as an antiseptic, i.e. for disinfecting, topically and internally as a therapeutic agent in combatting pathogenic bacteria, e.g. in cases of staphylodermatitis, bacterial pneumonia, leptopsrosis, rickettsiosis and salmonellosis, etc.

Mitomycin C is also useful as an intermediate, e.g. in the preparation of methyl mitomycin by reaction with methyl iodide, for other antibiotics.

Mitomycin C is of marked tolerability. The acute toxicity of the material is about $LD_{50}=5$ mg./kg. in the mouse.

The following examples represent presently preferred embodiments of the isolation of Mitomycin C. In these examples, as in the preceding text, percentages are by weight unless otherwise identified. Parts by weight are related to parts by volume as grams are related to milliliters. The expression "w./v." signifies parts by weight per part by volume and may be expressed in a percentage based on the resulting proportion. The potency assays are carried out by the dilution method, employing *Bacillus subtilis* (PCI 219) as the test organism.

EXAMPLE 1

A broth consisting of 2% (w./v.) of glucose, 3.5% (w./v.) of soybean meal, 0.3% (w./v.) of meat extract, 0.5% (w./v.) of sodium chloride, 0.5% (w./v.) of yeast, 0.3% (w./v.) of calcium carbonate and the remainder water, and having a pH of about 7.2, is sterilized by steam at 120° C. The sterilized broth is then inoculated with a spore suspension of *Streptomyces caespitosus* (NRRL 2564), and cultivation carried out by aerating for 72 hours at 28° C. At the end of this period, the broth is filtered to remove the mycelia.

10 kilograms of active carbon are added to 1000 liters of the so-obtained (60 γ/ml. as Mitomycin C) broth filtrate and after stirring the admixture for 30 minutes, it is filtered with addition of 5 kilograms of filter aid (Dicalite) thereto. The collected active carbon is dehydrated by washing with 30 liters of methanol and is then eluted three times, successively, with 30 liters each of pure acetone. The eluate is concentrated under reduced pressure, and 300 grams of purple concentrated residue are obtained. Its potency is 9000 u./mg.

EXAMPLE 2

10 kilograms of active carbon is added to 1000 liters of (60 γ/ml. as Mitomycin C) broth filtrate (obtained according to Example 1) and after stirring the resulting admixture for 30 minutes, it is filtered with addition of 5 kilograms of filter aid (Dicalite) thereto. The collected active carbon is immediately eluted three times successively with 30 liters each of pure acetone. The eluate is concentrated under reduced pressure until there remains substantially no acetone, and about 8 liters of aqueous solution are obtained. About 3 kilograms of common salt are added to and dissolved in the solution. Thereafter said solution is extracted twice with 8 liters each of chloroform. When the extract is concentrated, 100 grams of purple concentrated residue are produced. Its potency is 15,000 u./mg.

EXAMPLE 3

A column consisting of 1.8 l. of non ion exchange resin ("Duolite S-30") in a tube with 8 cm. diameter and 100 cm. height was regenerated by passing 4% NaOH followed by 1% $H_2SO_4$.

Then, 43 ml. of a culture filtrate exhibiting an activity of 31.7γ Mitomycin C per ml. was passed through from the top of the column at a space velocity of 1.2.

The mitomycin concentrations of the effluent fractions are as follows:

| | Volume (ml.) | Concentration [1] |
|---|---|---|
| Fraction No.: | | |
| 1 | 1,330 | 6 |
| 2 | 500 | 1,639 |
| 3 | 500 | 518 |
| 4 | 500 | 122 |
| 5 | 500 | 45 |
| 6 | 500 | 20 |
| 7 | 500 | 11 |
| 8 | 500 | 4 |
| 9 | 500 | 2 |
| 10 | 950 | 2 |

[1] γ/ml. expressed as Mitomycin C activity.

Fractions from No. 2 through No. 7 were combined and evaporated to yield 460 ml. of an aqueous solution, which was extracted three times with 460 ml. portions of chloroform. The extracts were combined (1300 ml.) and evaporated in vacuo to give 19 g. of purple residue exhibiting a 45,000 u./mg. Mitomycin C activity.

EXAMPLE 4

The concentrated residue obtained in Example 1 is dissolved in 3 liters of chloroform, and insoluble white crystals are filtered out. The filtrate is passed through a tower packed with 1500 grams of active alumina (diameter 7 cm., height 40 cm.). After washing with 500 milliliters of chloroform, chloroform which contains 1% methanol is passed through the tower for elution. During the elution, the methanol content is progressively increased from 1% to 6%. The total volume of chloroform passed through the alumina is about 8 to 10 liters. The material eluted with chloroform containing 3 to 6% of methanol is concentrated down to about 100 milliliters under reduced pressure and filtered, and then further concentrated to substantial dryness. 5 to 10 milliliters of acetone are added, whereupon 10 grams of purple crystals of Mitomycin C are obtained. Its potency is 100,000 u./mg.

EXAMPLE 5

The concentrated residue obtained in Example 2 is dissolved in 2 liters of chloroform, and insolubles are filtered out. The filtrate is passed through a tower packed with 1 kilogram of active alumina (diameter 7 cm., height 26 cm.). Four liters of chloroform which contains 0.5% methanol are then passed through the tower, and after the washing and developing, that (uppermost) portion of the alumina carrying the purple adsorption layer of desired antibiotic is cut off and taken out of the tower. It is then eluted with 100 milliliters of pure methanol, the extract is concentrated under reduced pressure, and 5 milliliters of acetone are added thereto, whereby 13 grams of purple crystals of Mitomycin C are obtained. Its potency is 95,000 u./mg.

It will be understood that the new substance in the form of the aforementioned crystals makes it possible to realize a controlled administration thereof for therapeutic purposes, as mentioned. To this end, the crystals are advantageously incorporated into an ointment base, or into a solvent, or into an inert powder, or into tablet-forming excipients, or are encapsulated in capsules.

EXAMPLE 6

Two grams of crystalline Mitomycin C was mixed together either with 48 g. NaCl or with 48 g. NaCl plus 488–498 g. of a crystalline sugar (glucose or sucrose) to make a preparation in powder.

EXAMPLE 7

One gram of crystalline Mitomycin C was mixed thoroughly with from 488 to 498 g. of an ointment base such as glycerine, carbowax, vaseline or lanolin to give ointment preparation.

EXAMPLE 8

Two grams of Mitomycin C crystals was dissolved in propylene glycol to a volume from 50 to 500 ml. This solution, when administered orally or parenterally to mice with infected bacteria, gave a marked inhibitory effect.

EXAMPLE 9

An inert preparation in powder according to Example 6, sprayed over ulcerous loquat, gave an excellent effect.

EXAMPLE 10

Minute powders of crystalline Mitomycin C or a preparation in powder as described in Exambple 6 were filled in gelation capsules to an amount of 0.5–10 mg. each. Oral administration of the capsules to patients gave a therapeutic effect.

EXAMPLE 11

Two grams of crystalline Mitomycin C was mixed with 10–15 g. of starch and 140–180 g. of sodium bicarbonate. The resulting mixture was blended thoroughly with 10–30% of gumarabicum or 50 ml. of aqueous polyvinyl alcohol, passed through a screen to a granular state, dried and formed into tablets weighing from 200 to 1000 mg. The tablets, given orally to patients, exhibited an excellent therapeutic effect.

EXAMPLE 12

A solution containing crystalline Mitomycin C in a solvent such as methanol and ethanol to a concentration of 1–10 mg./ml. was sprayed over corruptible raw food materials such as vegetables and uncooked fishes. A preventive effect against putrefaction was noticed.

EXAMPLE 13

Crystalline Mitomycin C was formulated into various preparations according to the methods in the examples from 6 through 11. Inhibitory effects against pathogenic bacteria were obtained as described in the respective examples.

EXAMPLE 14

Crystalline Mitomycin C was formulated into various preparations according to the method in the examples from 6 through 11 and applied to experimental animals and patients. Marked effects were obtained.

What is claimed is:

1. The compound of the formula

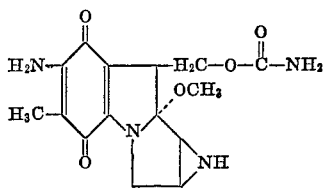

2. A therapeutic composition comprising a therapeutically acceptable carrier containing an effective anti-bacterial amount of a therapeutic, compound of the formula

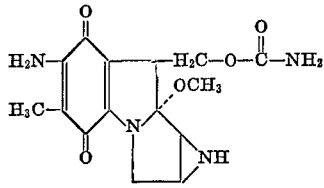

3. A therapeutic composition comprising an ointment and an effective anti-bacterial amount of the antibiotic of the formula

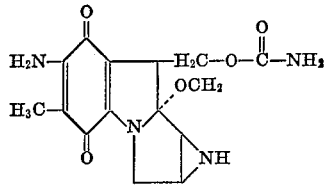

4. A therapeutic composition comprising a therapeutically acceptable solution containing an effective anti-bacterial amount of an antibiotic compound of the formula

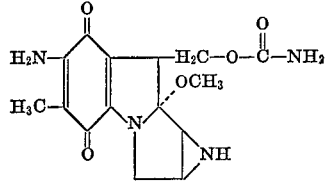

5. The therapeutic composition of claim 4, wherein said antibiotic has a concentration in said solution of about 1 to 10 milligrams per milliliter.

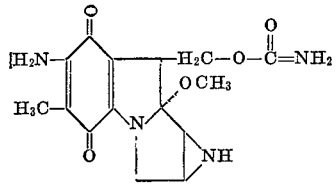

6. A therapeutic composition which consists essentially of an intimate admixture of a therapeutically acceptable inert powder and an effective anti-bacterial amount of the antibiotic of the formula

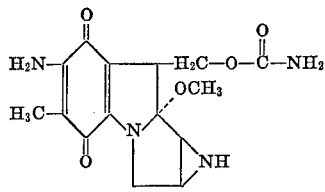

7. The therapeutic composition of claim 6, wherein said antibiotic has a concentration of about 0.365 to 4.0 weight percent.

8. A therapeutic composition comprising a gelation capsule carrier and an effective anti-bacterial amount of an antibiotic of the formula

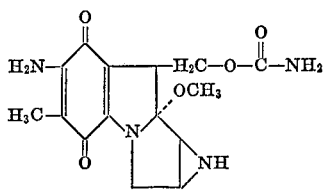

9. A therapeutic composition in tablet form which consists essentially of therapeutically acceptable tablet-forming excipients and an effective anti-bacterial amount of an antibiotic of the formula

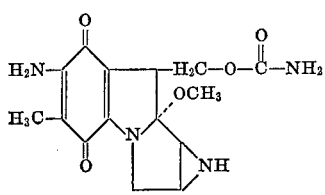

10. The therapeutic composition of claim 9, wherein said antibiotic has a concentration in said excipients of about 0.79 to 1.21 weight percent.

11. A method for producing Mitomycin C which comprises (a) cultivating *Streptomyces caespitosus* (NRRL No. 2564) in a medium containing a carbon source, soy bean meal and an inorganic salt (b) filtering off mycelium (c) contacting the filtrate with an adsorbent selected from the group consisting of active carbon and a non-ion exchange resin (d) eluting the resulting adsorbent with acetone (e) evaporating the acetone (f) saturating the resulting aqueous solution with sodium chloride (g) extracting the product with chloroform (h) chromatographically separating Mitomycin A, Mitomycin B and other impurities from the extract on alumina (i) eluting the resulting product with methanol (j) concentrating the eluate and (k) separating the resulting purple crystals, which are Mitomycin C.

12. A method for producing Mitomycin C which comprises (a) cultivating *Streptomyces caespitosus* (NRRL No. 2564) in a medium containing a carbon source, soy bean meal and inorganic salt (b) filtering off mycelium (c) contacting the filtrate with active carbon (d) eluting the resulting active carbon with acetone (e) evaporating the acetone (f) saturating the resulting aqueous solution with sodium chloride (g) extracting the product with chloroform (h) chromatographically separating Mitomycin A, Mitomycin B and other impurities from the extract on alumina (i) eluting the resulting product with methanol (j) concentrating the eluate and (k) separating the resulting purple crystals, which are Mitomycin C.

13. A method for producing Mitomycin C which comprises (a) cultivating *Streptomyces caespitosus* (NRRL No. 2564) in a medium containing a carbon source, soy bean meal and an inorganic salt (b) filtering off mycelium (c) contacting the filtrate with a non-ion exchange resin (d) eluting the resulting non-ion exchange resin with acetone (e) evaporating the acetone (f) saturating the resulting aqueous solution with sodium chloride (g) extracting the product with chloroform (h) chromatographically separating Mitomycin A, Mitomycin B and other impurities from the extract on alumina (i) eluting the resulting product with methanol (j) concentrating the eluate and (k) separating the resulting purple crystals, which are Mitomycin C.

References Cited

Hata, J. F. Antibiotics, Ser. A., vol. 14, 1956, pages 141 to 146.

Wakai: Antibiotics and Chemotherapy, vol. 8, No. 8, 1958, pages 288 to 233.

JEROME D. GOLDBERG, Primary Examiner

U.S. Cl. X.R.

195—80; 260—326.3